(12) United States Patent
Christiansen (10) Patent No.: US 8,744,238 B2
(45) Date of Patent: Jun. 3, 2014

(54) METHOD AND APPARATUS FOR AUTOMATED CONTENT MARKING

(75) Inventor: Bernd Oliver Christiansen, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1547 days.

(21) Appl. No.: 11/843,345

(22) Filed: Aug. 22, 2007

(65) Prior Publication Data

US 2009/0055745 A1 Feb. 26, 2009

(51) Int. Cl.
*H04N 9/80* (2006.01)

(52) U.S. Cl.
USPC .......................................... 386/241

(58) Field of Classification Search
CPC ........... H04N 1/00; H04N 5/147; H04N 7/00; H04N 21/00; H04N 21/44008
See application file for complete search history.

(56) References Cited

U.S. PATENT DOCUMENTS

| | | | |
|---|---|---|---|
| 5,177,513 A * | 1/1993 | Saito | 352/129 |
| 5,694,514 A * | 12/1997 | Evans et al. | 386/240 |
| 6,154,771 A * | 11/2000 | Rangan et al. | 709/217 |
| 6,163,510 A * | 12/2000 | Lee et al. | 386/281 |
| 2002/0176689 A1* | 11/2002 | Heo et al. | 386/46 |
| 2003/0206715 A1* | 11/2003 | Peters et al. | 386/65 |
| 2005/0210501 A1* | 9/2005 | Zigmond et al. | 725/32 |
| 2006/0031782 A1* | 2/2006 | Houmura et al. | 715/808 |
| 2006/0080716 A1 | 4/2006 | Nishikawa et al. | |
| 2007/0094602 A1* | 4/2007 | Murabayashi | 715/723 |
| 2007/0201822 A1* | 8/2007 | Kusunoki et al. | 386/83 |
| 2008/0034325 A1* | 2/2008 | Ording | 715/838 |

FOREIGN PATENT DOCUMENTS

| | | |
|---|---|---|
| EP | 1164791 | 12/2001 |
| EP | 1781027 | 5/2007 |

OTHER PUBLICATIONS

International Search Report for corresponding PCT Application No. PCT/US2008/073821, mailed Dec. 19, 2008, 4 pages.
Written Opinion for corresponding PCT Application No. PCT/US2008/073821, mailed Dec. 19, 2008, 6 pages.

* cited by examiner

*Primary Examiner* — Huy T Nguyen
(74) *Attorney, Agent, or Firm* — McDermott Will & Emery LLP (57) ABSTRACT

Methods and apparatus for automatic content marking. In one embodiment, display information is recorded, a change in the computing environment is detected, and the recorded display information is marked in response to the detected change. A human-readable description of the change associated with the mark may also be stored. A change in the computing environment may be detected by detecting an event that reflects a change in the computing environment.

57 Claims, 5 Drawing Sheets

METHOD AND APPARATUS FOR AUTOMATED CONTENT MARKING

TECHNICAL FIELD

The invention generally relates to the automated association of recorded data with other meaningful information. More particularly, the invention relates to methods and apparatus for the automated marking of recorded content thereby facilitating subsequent operations involving the recorded content.

BACKGROUND

Scene change detection is an important problem in video systems. In a typical process for editing a video production, an operator uses a written log which describes the contents of each scene in the raw video footage and associates that information with the location on a tape using a time code number. An operator manually produces the log by viewing the tape and making notations when a scene change occurs.

Some prior art video systems overcome the time-consuming and cumbersome process of manual scene change detection using pixel-based scene change detection. In these pixel-based systems, later frames of a video are compared against earlier frames and the video is automatically segmented into scenes based on differences between the pixels in adjacent frames.

Computing devices, such as desktop computers, laptops, and handhelds, ostensibly include video systems that provide video information to end users. For example, most users interact with software programs through a graphical user interface that is presented on a computer monitor. The output of these video systems can be recorded and manipulated like any other traditional video data, such as a movie or television program.

The application of prior art techniques for video processing to video data recorded from a computer environment, however, only accounts for visual changes in the recorded data and ignores the semantics of changes to the computing environment reflected in the pixels changing in the recorded data. In essence, prior art systems may be able to observe that "something" happened in the recorded data, but these systems are not able to understand "what" happened in the computing environment that resulted in the changes in the recorded data, or understand the actions associated with or the events signified by that happening.

For example, some known systems utilize scene change detection to segment video into chapters. This technique, however, is typically limited to post-production analysis and is used to create chapters when there is a significant pixel difference between frames. This scene change detection feature is not designed to track events and changes occurring in video data recorded in a computing environment and cannot automatically identify portions of the recorded data associated with events or changes. Accordingly, known systems do not easily allow for the identification or playback of video data recorded from a computing environment associated with events that occurred while the video data was recorded, such as an application starting, a change in the foreground application, or an application going into full-screen mode.

There exists, therefore, a need for methods and apparatus for automatically associating video data recorded from a computing environment with other meaningful information, such as information describing changes in a computing environment.

SUMMARY OF THE INVENTION

The present invention relates to methods and apparatus for recording display information in a file, detecting a change in a computing environment, and marking the recorded display information in response to the detected change. More specifically, in accordance with certain embodiments of the present invention, a change in the computing environment is detected by detecting an event that reflects a change in the computing environment. For example, in some embodiments of the present invention, a change in the computing environment may be detected by detecting the execution or termination of a program, a change in the behavior of an executing program, or the opening, closing or changing of a file. In subsequent operations, a mark may be selected from a plurality of marks associated with the recorded display information and the portion of the recorded display information associated with the selected mark may be displayed. In certain embodiments of the invention, as described in detail below, a human-readable description of the change in the computing environment associated with the mark is stored.

In general, in one aspect, the invention provides a method for annotating recorded content. A computing device is provided having a computing environment comprising at least one executing program. Display information is recorded in a file. A change in the computing environment at the computing device is detected, and the recorded display information is marked in response to the detected change.

In general, in another aspect, the invention features an apparatus for recording and annotating content associated with a computing device having a computing environment comprising at least one executing program. The apparatus includes a storage device, a module for detecting a change in the computing environment at the computing device and a recording module. The recording module causes storage of display information in a file in the storage device and is responsive to the detection module, marking the recorded display information in response to the detected change.

Various embodiments of these aspects of the invention include the following features, or implement apparatus components achieving the following features:

Detecting a change in the computing environment may consist of detecting an event that reflects a change in the computing environment.

The display information may be an analog signal, a digital signal, or a video signal. In some embodiments, the display information may be the output of the executing program or the output of a program executing on a second computing device. In other embodiments, the display information may be at least one set of frame buffer contents or may include API calls to a display subsystem. In still other embodiments, the display information may be the output of a first executing application and the system also records the output of a second executing application providing output to a second visual display device in a second file.

Marking the recorded display information may include making an entry in the file comprising the recorded display information such that a portion of the recorded display information substantially contemporaneous with the change in the computing environment is associated with the entry. Marking the recorded display information may instead be achieved by making an entry in a file separate from the file comprising the recorded display information such that a portion of the recorded display information substantially contemporaneous with the change in the computing environment is associated with the entry.

The method may also include, and the apparatus may also implement components for selecting at least one mark from a plurality of marks associated with the recorded display information and displaying at least one portion of the recorded display information associated with the at least one selected mark.

The change in the computing environment may be at least one of several events, including execution of a program, termination of a program, a change in the behavior of an executing program, a change in the state of an executing program, a change of foreground application or a change of application focus. Other changes in the computing environment may include a program transitioning to execution in a full-screen mode or a program transitioning from execution in full-screen mode. A change in computing environment may also include creation, display, change, or destruction of a user interface element or opening, closing or a change to a file. Other events that may comprise a change in the computing environment may be printing a document, initiating, terminating or changing volume of audio playback, network communications, mouse input or keyboard input. The change in the computing environment may occur with or without user action.

The method may also include, and the apparatus may also implement a component for storing a human-readable description of the change in the computing environment associated with the mark. This human-readable description may be at least one of a process name, an event, a window title, a file name or a slide number.

The method may include, and the apparatus may implement components for recording the state of a first part of the computing environment, comparing a later state of the first part of the computing environment against the recorded state and detecting a difference between the recorded state and the later state.

In some embodiments, at least part of the recorded display information and/or information that is related to the mark is displayed in juxtaposition with at least one of the marks. This information may be, for example, contextual advertising.

In general, in yet another aspect, the invention features a machine-readable storage medium containing instructions for a computing device having a computing environment comprising at least one executing program. The set of instructions includes instructions for recording at the computing device display information in a file and instructions for detecting at the computing device a change in the computing environment. The set of instructions also includes instructions for marking the recorded display information in response to the detected change.

Various embodiments of this aspect of the invention include the following features.

In some embodiments, the instructions for detecting a change in the computing environment may include instructions for detecting an event that reflects a change in the computing environment.

In other embodiments, the instructions for marking the recorded display information include instructions for making an entry in the file comprising the recorded display information or in a file separate from the file comprising the recorded display information such that a portion of the recorded display information substantially contemporaneous with the change in the computing environment is associated with the entry.

The machine-readable storage medium may also include instructions for selecting a mark (or marks of a specified type) from a plurality of marks associated with the recorded display information and instructions for displaying the at least one portion of the recorded display information associated with the at least one selected mark.

The storage medium may also include instructions for storing a human-readable description (comprising, e.g., a process name, an event, a window title, a file name or a slide number) of the change in the computing environment associated with the mark.

The instructions for detecting a change in the computing environment may include instructions for recording the state of a first part of the computing environment, instructions for comparing a later state of the first part of the computing environment against the recorded state and instructions for detecting a difference between the recorded state and the later state.

The storage medium may also include instructions for displaying at least part of the recorded display information and/or information that is related to the mark in juxtaposition with at least one of the marks. This information may be, for example, contextual advertising.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

In general, embodiments of the present invention pertain to methods and apparatus for the automated association of recorded content with information describing changes in a computing environment, thereby facilitating subsequent operations utilizing the recorded content. In accordance with one aspect of the invention, a module detects a change in the computing environment, for example a change in the behavior of an executing program or a termination of a program, and a recording module marks the recorded display information in response to the detected change and causes the storage of display information in a file in a storage device. In one embodiment, a human-readable description of the change in the computing environment associated with the mark is stored. The recording of the display information in a file and the detecting of a change in the computing environment typically occur at the same computing device, although embodiments of the invention allow for these operations to occur on different computing devices.

Figure 1:
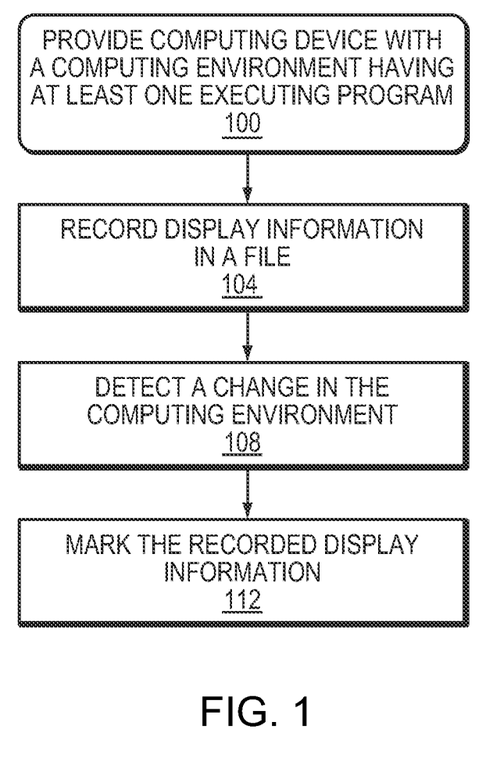
FIG. 1 is a flowchart of an illustrative embodiment of a method for marking recorded content in accordance with the invention.

FIG. 1 depicts an exemplary method for marking recorded content in accordance with the present invention. The method includes providing a computing device with a computing environment having at least one executing program (STEP 100) and at the computing device, recording display information in a file (STEP 104), and detecting a change in the computing environment (STEP 108). An executing program may be, for example, any of the programs offered by Microsoft Corporation of Redmond, Wash., such as MICROSOFT WORD, MICROSOFT EXCEL, or MICROSOFT POWERPOINT.

A change in the computing environment may be the execution of a program, the termination of a program, a program transitioning from execution in full-screen mode to execution in windowed mode, the opening of a file, the closing of a file, or a change to a file, among other events.

Detecting a change in the computing environment (STEP 108) may occur, for example, by detecting an event that reflects a change in the computing environment. For example, the termination of a program may be detected by detecting the selection of a menu item terminating the program, a keystroke combination that terminates the program, or registering a callback function with the operating system kernel.

The display information that is recorded may be, for an example, a video signal, such as an analog signal or a digital signal. The display information may be, in one embodiment, a video signal representing the output of a program executing on the same computing device recording the display information or a different computing device.

Figure 2:
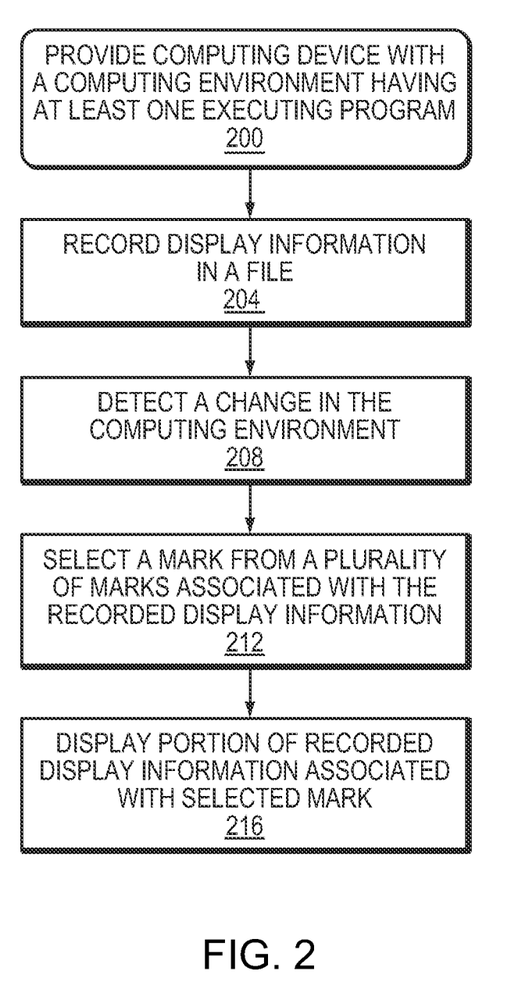
FIG. 2 is a flow diagram of another illustrative embodiment of a method for marking recorded content in accordance with the invention.

FIG. 2 presents another exemplary method for marking recorded content in accordance with the present invention. The method includes providing a computing device with a computing environment having at least one executing program (STEP 200), recording display information in a file (STEP 204), and detecting a change in the computing environment (STEP 208). A mark is then selected from a plurality of marks associated with the recorded display information (STEP 212). A portion of the recorded display information associated with the selected mark is then displayed (STEP 216).

Figure 3:
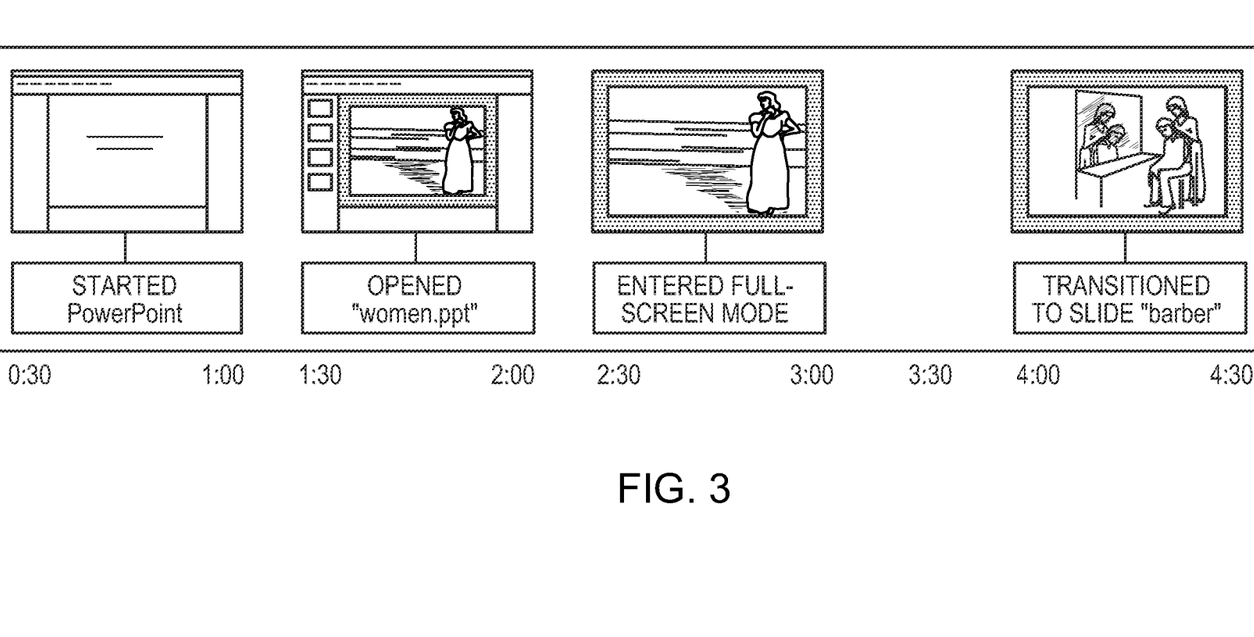
FIG. 3 is a conceptual illustration of an example of marked recorded content in accordance with the invention.

FIG. 3 is an example of content recorded and annotated in accordance with the present invention. In this example, the figure depicts a playback of recorded content, with tags displayed as texts (e.g., "Started PowerPoint" or "Entered full-screen mode").

With reference to FIG. 3, the example of recorded display output presented is representative of five minutes of recorded screen output from a computer executing various application programs. The recorded display output indicates that at time 0:30, the computer is executing the aforementioned MICROSOFT POWERPOINT program. The recorded screen output, of which the displayed image is representative, reflects the output at the computer's display as the program executes, including, e.g., the display of the POWERPOINT splash screen and the opening and display of a selected POWERPOINT file. As can be seen from FIG. 3, an embodiment of the present invention has operated to mark this part of the sequence of recorded content with the tag "Started PowerPoint," which was determined by observing changes in the computing environment, such as the creation of a thread to execute the POWERPOINT application, the system calls associated with the POWERPOINT application, etc. Notably, in this example, the text "Started PowerPoint" was generated by the embodiment of the invention without human intervention by monitoring changes within the computing environment.

The example of recorded display output presented in FIG. 3 indicates that at time 1:30, the POWERPOINT application opened a file called "women.ppt," which one of ordinary skill would recognize to be a POWERPOINT presentation file. The recorded screen output, of which the displayed image is representative, reflects the output at the computer's display as the program executes, e.g., indicating the opening and display of the "women.ppt" file. As can be seen from FIG. 3, an embodiment of the present invention has operated to mark this part of the sequence of recorded content with the tag "Opened 'women.ppt,'" which was determined observing changes in the computing environment, such as the user's operation of a menu command to open the "women.ppt" file or the monitoring of the system calls associated with the opening of the "women.ppt" file. Notably, in this example, the text "Opened 'women.ppt'" was generated by the embodiment of the invention without human intervention by monitoring changes within the computing environment.

The example of recorded display output presented in FIG. 3 further indicates that at time 2:30, the POWERPOINT application entered full-screen mode, which one of ordinary skill would understand to mean that the output of the POWERPOINT application supersedes that of the other programs executing in the computing environment, thereby monopolizing the computing environment's display to the user. The recorded screen output, of which the displayed image is representative, reflects the output at the computer's display as the program executes, e.g., indicating the display of the "women.ppt" file in full-screen mode. As can be seen from FIG. 3, an embodiment of the present invention has operated to mark this part of the sequence of recorded content with the tag "Entered full-screen mode" which was determined by observing changes in the computing environment, such as the user's operation of a menu command to make the POWERPOINT application execute in full-screen mode or tracking the properties of the foreground window. Notably, in this example, the text "Entered full-screen mode" was generated by the embodiment of the invention without human intervention by monitoring changes within the computing environment.

The example of recorded display output presented in FIG. 3 indicates that at time 3:30, the POWERPOINT application transition from the display of the first slide to a new slide entitled "Barber." The recorded screen output, of which the displayed image is representative, reflects the output at the computer's display as the POWERPOINT program executes, e.g., displaying the "Barber" slide in full-screen mode. As can be seen from FIG. 3, an embodiment of the present invention has operated to mark this part of the sequence of recorded content with the tag "Transitioned to slide 'barber'" which was determined by observing changes in the computing environment, such as the user's operation of a menu command to make the POWERPOINT application transition to the "Barber" slide or a plug-in registering a callback function with PowerPoint. Notably, in this example, the text "Transitioned to slide 'barber'" was generated by the embodiment of the invention without human intervention by monitoring changes within the computing environment.

As described above, embodiments of the present invention augment any method for recording the contents of a screen with the generation of semantically-rich tags relating to a computing environment under observation. Embodiments of the present invention "listen" for system-generated events and observe changes in a computing environment while recording content, such as display output, that is presented contemporaneously with the changes in the computing environment. The events and observed changes are then translated, in either real-time or post-production, into semantically rich tags that are associated with portions of recorded display output that were substantially contemporaneous with the events and changes that resulted in the generation of the tags.

For example, an event signaling the activation of the window with the title "Microsoft PowerPoint—[women.ppt]" can be easily translated into human-readable tag "Opened 'women-.ppt,'" as depicted in FIG. 3.

These tags and their associated human-readable description can be saved in the same file as the recorded content or in a separate data structure. Since the description associated with a tag typically includes parameters such as, e.g., process name, window title, file name or slide number, tagged content can be easily searched (e.g., to find all content files that display "women.ppt" in PowerPoint). Furthermore, content files can be semi-automatically edited or shortened by only retaining the content associated with certain tags (e.g., by cutting all recorded content in which the tags indicate that PowerPoint is not in the foreground application).

As described above, various embodiments of the present invention observe changes in a computing environment, tag recorded content in response to a detected change, and optionally include human-readable description with the tag that relates to the observed changes. Various mechanisms are available to allow embodiments of the present invention to detect changes in a computing environment. Modern operating systems provide ways to monitor process creation and termination, file input/output, network input/output, and other kernel objects.

Certain operating systems, such as MICROSOFT WINDOWS and MAC OS X, or window managers, such as X WINDOWS, notify registered listeners when an event occurs in the user interface. For example, the Win32 method, SetWindowsHookEx( ) registers a listener to be notified when certain events occur. Some of these events can be translated into tags in a straightforward manner, e.g., when a top-level window is created or destroyed, a window is activated or loses focus, a window enters or leaves full-screen mode, a screen saver is activated or deactivated, or keyboard or mouse events are received.

Once an event has been observed, an appropriate human-readable tag can often be developed in a straightforward manner, e.g., for a file being opened or an HTTP request being issued. Even when an event cannot be directly observed, the ability to query the state of some kernel objects can be used to infer the occurrence of an event and thereby generate human-readable tags. For example, a process's CPU load dropping sharply after an extended period of high CPU utilization may define the end of a long-running computational task (such as, e.g., applying a filter to an image in ADOBE PHOTOSHOP). Other tags can be derived by periodically querying the state of user interface objects. For example, a searchable index can be generated by periodically querying the text of all visible windows. Lastly, some operating systems support accessibility features that translate images, video and audio into textual representations, effectively allowing for the creation of textual tags without human intervention.

Embodiments of the present invention also detect changes in the computing environment concerning individual applications. For example, some applications, such as MICROSOFT OFFICE, support add-ons that extend their functionality. Since add-ons become part of the application in which they are embedded, in one embodiment add-ons may be used to create tags that capture the semantics of the application's internal state. For example, a PowerPoint add-on could create tags when a new presentation is opened, a slide transition occurs, or PowerPoint enters full-screen mode. In other embodiments, changes in the application can be inferred from monitoring the application's interaction with the operating system, or changes in the operating system itself.

Figure 4:
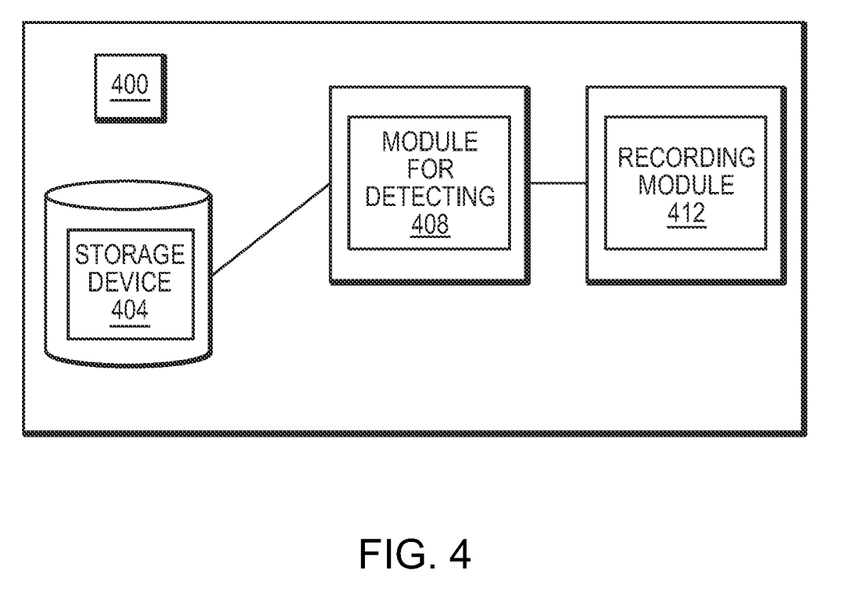
FIG. 4 is a block diagram of an illustrative embodiment of an apparatus for recording and marking content in accordance with the invention.

FIG. 4 is an illustrative embodiment of an apparatus for recording and annotating content in accordance with the invention. The figure shows an apparatus 400 for recording and annotating content associated with a computing device having a computing environment comprising at least one executing program. The apparatus 400 includes a storage device 404 and a module for detecting 408, at the computing device, a change in the computing environment. The apparatus also has a recording module 412 for causing storage of display information in a file in the storage device 404. The recording module 412 s marks the recorded display information in response to the detected change by the detection module 408.

Figure 5:
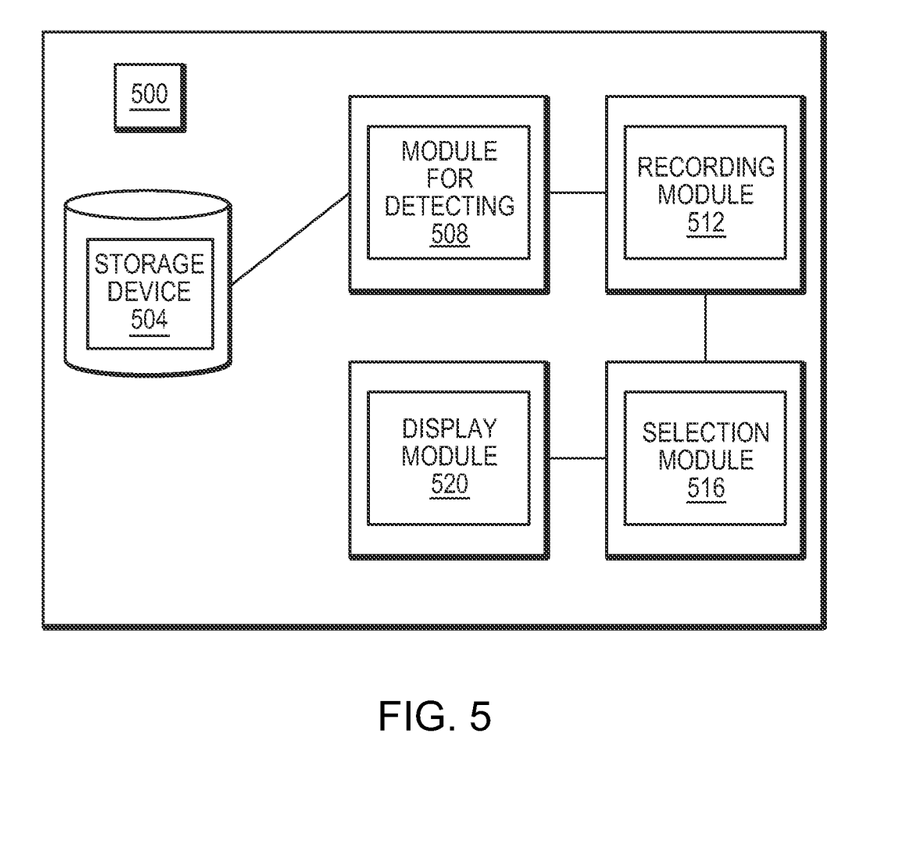
FIG. 5 is a block diagram of another illustrative embodiment of an apparatus for recording and marking content in accordance with the invention.

Referring to FIG. 5, in addition to the storage device 504, the detection module 508, and the recording module 512, the apparatus 500 may also include a selection module 516 and a display module 520. The selection module 516 receives a selection of a mark from a plurality of marks associated with the recorded display information. The display module 520 then displays the portion of the recorded display information associated with the selected mark.

Referring to FIGS. 4 and 5, the detection modules 408, 508 may detect a change in the computing environment in a variety of ways. While, as discussed above, some changes to the computing environment may trigger a notification to be sent to the registered listeners (e.g., a window being created, a process being started, or a file being changed), other changes to the computing environment can be determined through queries (e.g., changes to the window hierarchy or changes in processor utilization). For example, one can observe changes to the computing environment that do not trigger a notification by querying the state of some aspect of the computing environment and then comparing it to a record of a previous state.

Embodiments of the present invention are suited to many applications. One application involves the recording of application output at a computer desktop that is automatically annotated to reflect events that are occurring at the computer desktop. This allows for, e.g., the creation of presentations or training videos that are indexed according to the activities performed on the computer, allowing a user to jump to different parts of the video associated with particular activities.

Another application involves the recording of application output originating at another computer that is automatically annotated to reflect events occurring at the computer recording the application output. This allows for, e.g., a user to record an online presentation and subsequently jump to different parts of the recorded video that coincide with particular activities that the user undertook at the time that they originally viewed the presentation.

By automatically annotating the recorded content, embodiments of the present invention provide sufficient information so that, e.g., in subsequent viewing of the recorded content, the annotations facilitate the identification and presentation of advertisements, such as contextual advertisements or banner advertisements. The same type of advertising may also be provided in real time as the content is initially viewed, using the annotations as they are added in real time.

Still another application involves the recording of application output for one or more display environments associated with a single computing device and the annotation of that recorded output to reflect changes in the computing environment for that device, the particular display environment associated with the executing application, or still another display environment.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein are not mutually exclusive and can exist in various combinations and permutations, even if such combinations or permutations were not expressly described herein, without departing from the spirit and scope of the invention.

In fact, variations, modifications, and other implementations of what was described herein will occur to those of ordinary skill in the art without departing from the spirit and the scope of the invention. As such, the invention is not to be defined only by the preceding illustrative description. In particular, it will be understood by one of ordinary skill that FIGS. 4 and 5 are simplified illustrations of the apparatus 400, 500 and that they are depicted as such to facilitate the explanation of the present invention. The apparatus 400, 500 may be modified in any of a variety of manners without departing from the spirit and scope of the invention and therefore the depictions of the apparatus 400, 500 in FIGS. 4 and 5 are non-limiting.

What is claimed is:

1. A method for textually annotating recorded content, the method comprising:
    at a computing device having a computing environment comprising at least one executing program, recording display information, relating to an output of the at least one executing program, in a file;
    detecting a change of a display state in the computing environment effecting the display information by:
        receiving a notification in a case where the change of the display state triggers a notification to be provided, and
        querying a current display state and comparing the current display state to a stored record of a previous display state in a case where the change of the display state does not trigger the notification to be provided; and
    textually annotating the recorded display information, with information indicating the detected change, in response to the detected change.

2. The method of claim 1 wherein detecting a change in the computing environment comprises detecting an event that reflects a change in the computing environment.

3. The method of claim 1 wherein the display information is an analog signal or a digital signal.

4. The method of claim 1 wherein the display information is a video signal.

5. The method of claim 1 wherein the display information comprises the output of the executing program.

6. The method of claim 1 wherein the display information comprises the output of a program executing on a second computing device.

7. The method of claim 1 wherein the display information comprises at least one set of frame buffer contents.

8. The method of claim 1 wherein the display information comprises API calls to a display subsystem.

9. The method of claim 1 wherein textually annotating the recorded display information comprises making an entry in the file comprising the recorded display information such that a portion of the recorded display information substantially contemporaneous with the change in the computing environment is associated with the entry.

10. The method of claim 1 wherein textually annotating the recorded display information comprises making an entry in a file separate from the file comprising the recorded display information such that a portion of the recorded display information substantially contemporaneous with the change in the computing environment is associated with the entry.

11. The method of claim 1 further comprising:
    selecting a mark from a plurality of marks associated with the recorded display information; and
    displaying the portion of the recorded display information associated with the selected mark.

12. The method of claim 1 further comprising:
    selecting marks of a specified type from a plurality of marks associated with the recorded display information; and
    displaying at least one portion of the recorded display information associated with at least one selected mark.

13. The method of claim 1 wherein the change in the computing environment comprises at least one of execution of a program, termination of a program, a change in the behavior of an executing program, a change in the state of an executing program, a change of foreground application, a change of application focus, a program transitioning to execution in full-screen mode, a program transitioning from execution in full-screen mode, creation of a user interface element, display of a user interface element, a change in a user interface element, destruction of a user interface element, opening a file, closing a file, a change to a file, printing a document, initiating audio playback, terminating audio playback, changing volume of audio playback, network communications, mouse input, or keyboard input.

14. The method of claim 1 wherein the change in the computing environment occurs without user action.

15. The method of claim 1 wherein the change in the computing environment reflects user action.

16. The method of claim 1 further comprising:
    storing a human-readable description of the change in the computing environment associated with the detected change.

17. The method of claim 16 wherein the human-readable description comprises at least one of a process name, an event, a window title, a file name, or a slide number.

18. The method of claim 1 further including detecting the change in the computing environment by:
    recording an initial state of a part of the computing environment;
    comparing a later state of the part of the computing environment against the initial state; and
    detecting a difference between the initial state and the later state.

19. The method of claim 1 further comprising selecting marks of a specified type from a plurality of marks associated with the recorded display information and displaying at least part of the recorded display information in juxtaposition with at least one of the marks.

20. The method of claim 1 further comprising selecting marks of a specified type from a plurality of marks associated with the recorded display information and displaying information that is related to the mark in juxtaposition with at least one of the marks.

21. The method of claim 20 wherein the related information displayed is contextual advertising.

22. The method of claim 1 wherein the computing device comprises at least two visual display devices, the computing environment comprises at least two executing programs, the first executing program providing an output to the first visual display device and the second executing program providing an output to the second visual display device, the recorded display information comprises the output of the first executing program, and the method further comprising recording, at the computing device, the output of the second executing program to a second file.

23. An apparatus for recording and textually annotating content associated with a computing device having a computing environment comprising at least one executing program, the apparatus comprising:
a storage device;
a detection module, at the computing device, for detecting a change of a display state in the computing environment effecting display information, relating to an output of the at least one executing program, the detection module operating by:
receiving a notification in a case where the change of the display state triggers a notification to be provided, and
querying a current display state and comparing the current display state to a stored record of a previous display state in a case where the change of the display state does not trigger the notification to be provided; and
a recording module for causing storage of the display information in a file in the storage device, the recording module being responsive to the detection module and textually annotating the recorded display information, with information indicating the detected change, in response to the detected change.

24. The apparatus of claim 23 wherein the detection module detects an event that reflects a change in the computing environment.

25. The apparatus of claim 23 wherein the recording module stores display information that is an analog signal or a digital signal.

26. The apparatus of claim 23 wherein the recording module stores display information that is a video signal.

27. The apparatus of claim 23 wherein the recording module stores display information that comprises the output of the executing program.

28. The apparatus of claim 23 wherein the recording module stores display information that comprises the output of a program executing on a second computing device.

29. The apparatus of claim 23 wherein the recording module stores display information that comprises at least one set of frame buffer contents.

30. The apparatus of claim 23 wherein the recording module stores display information that comprises API calls to a display subsystem.

31. The apparatus of claim 23 wherein the recording module comprises a module for making an entry in the file comprising the recorded display information such that a portion of the recorded display information substantially contemporaneous with the change in the computing environment is associated with the entry.

32. The apparatus of claim 23 wherein the recording module comprises a module for making an entry in a file in the storage device separate from the file comprising the recorded display information such that a portion of the recorded display information substantially contemporaneous with the change in the computing environment is associated with the entry.

33. The apparatus of claim 23 further comprising:
a module for receiving a selection of a mark from a plurality of marks associated with the recorded display information; and
a module for displaying the portion of the recorded display information associated with the selected mark.

34. The apparatus of claim 23 further comprising:
a module for receiving a selection of a specified type of mark from a plurality of marks associated with the recorded display information; and
a module for displaying at least one portion of the recorded display information associated with at least one selected mark.

35. The apparatus of claim 23 wherein the detection module detects at least one of execution of a program, termination of a program, a change in the behavior of an executing program, a change in the state of an executing program, a change of foreground application, a change of application focus, a program transitioning to execution in full-screen mode, a program transitioning from execution in full-screen mode, creation of a user interface element, display of a user interface element, a change in a user interface element, destruction of a user interface element, opening a file, closing a file, a change to a file, printing a document, initiating audio playback, terminating audio playback, changing volume of audio playback, network communications, mouse input, or keyboard input.

36. The apparatus of claim 23 wherein the detection module detects a change in the computing environment that occurs without user action.

37. The apparatus of claim 23 wherein the detection module detects a change in the computing environment that reflects user action.

38. The apparatus of claim 23 further comprising:
a module for storing a human-readable description of the change in the computing environment associated with the detected change.

39. The apparatus of claim 38 wherein the module for storing a human-readable description stores a human-readable description comprising at least one of a process name, an event, a window title, a file name, or a slide number.

40. The apparatus of claim 23 wherein the detection module comprises:
a second recording module for recording an initial state of a part of the computing environment;
a comparator for comparing a later state of the part of the computing environment against the initial state; and
a detector detecting the difference between the initial state and the later state.

41. The apparatus of claim 23 further comprising:
a module for receiving a selection of a specified type of mark from a plurality of marks associated with the recorded display information; and
a module for displaying at least part of the recorded display information in juxtaposition with at least one of the marks.

42. The apparatus of claim 23 further comprising:
a module for receiving a selection of a specified type of mark from a plurality of marks associated with the recorded display information; and
a module for displaying information that is related to the mark in juxtaposition with at least one of the marks.

43. The method of claim 42 wherein the related information displayed is contextual advertising.

44. The apparatus of claim 23 wherein the computing device comprises at least two visual display devices, the computing environment comprises at least two executing programs, the first executing program providing an output to the first visual display device and the second executing program providing an output to the second visual display device, the recorded display information comprises the output of the first executing program, and the apparatus further comprises a second recording module for causing storage of the output of the second executing program in a second file in the storage device.

45. A non-transitory machine-readable storage medium containing instructions for a computing device having a computing environment comprising at least one executing program, the set of instructions comprising:
   instructions for recording, at the computing device, display information, relating to an output of the at least one executing program, in a file;
   instructions for detecting, at the computing device, a change of a display state in the computing environment effecting the display information by:
      receiving a notification in a case where the change of the display state triggers a notification to be provided, and
      querying a current display state and comparing the current display state to a stored record of a previous display state in a case where the change of the display state does not trigger the notification to be provided; and
   instructions for textually annotating the recorded display information, with information indicating the detected change, in response to the detected change.

46. The non-transitory machine-readable storage medium of claim 45 wherein the instructions for detecting a change in the computing environment comprise instructions for detecting an event that reflects a change in the computing environment.

47. The non-transitory machine-readable storage medium of claim 45 wherein the instructions for marking the recorded display information comprise instructions for making an entry in the file comprising the recorded display information such that a portion of the recorded display information substantially contemporaneous with the change in the computing environment is associated with the entry.

48. The non-transitory machine-readable storage medium of claim 45 wherein instructions for marking the recorded display information comprise instructions for making an entry in a file separate from the file comprising the recorded display information such that a portion of the recorded display information substantially contemporaneous with the change in the computing environment is associated with the entry.

49. The non-transitory machine-readable storage medium of claim 45 further comprising:
   instructions for selecting a mark from a plurality of marks associated with the recorded display information; and
   instructions for displaying the portion of the recorded display information associated with the selected mark.

50. The non-transitory machine-readable storage medium of claim 45 further comprising:
   instructions for selecting marks of a specified type from a plurality of marks associated with the recorded display information; and
   instructions for displaying at least one portion of the recorded display information associated with at least one selected mark.

51. The non-transitory machine-readable storage medium of claim 45 further comprising:
   instructions for storing a human-readable description of the change in the computing environment associated with the detected change.

52. The non-transitory machine-readable storage medium of claim 50 wherein the human-readable description comprises at least one of a process name, an event, a window title, a file name, or a slide number.

53. The non-transitory machine-readable storage medium of claim 50 wherein the instructions for detecting a change in the computing environment comprise:
   instructions for recording an initial state of a part of the computing environment;
   instructions for comparing a later state of the part of the computing environment against the initial state; and
   instructions for detecting a difference between the initial state and the later state.

54. The non-transitory machine-readable storage medium of claim 45, the set of instructions further comprising instructions for recording, at the computing device, display information in a second file.

55. The non-transitory machine-readable storage medium of claim 45, the set of instructions further comprising instructions for selecting a mark from a plurality of marks associated with the recorded display information and instructions for displaying at least part of the recorded display information in juxtaposition with at least one of the marks.

56. The non-transitory machine-readable medium of claim 45, the set of instructions further comprising instructions for selecting a mark from a plurality of marks associated with the recorded display information and instructions for displaying information that is related to the mark in juxtaposition with at least one of the marks.

57. The non-transitory machine-readable medium of claim 56, wherein the instructions for displaying information that is related to the mark in juxtaposition comprise instructions for displaying contextual advertising in juxtaposition.

\* \* \* \* \*